(12) United States Patent
Tabuchi et al.

(10) Patent No.: US 6,209,191 B1
(45) Date of Patent: Apr. 3, 2001

(54) METHOD FOR MANUFACTURING PULLEY INTEGRATED TYPE ROTOR

(75) Inventors: Yasuo Tabuchi, Toyoake; Hiroshi Shohara, Toyohashi; Yasuji Kasuya, Okazaki; Satoshi Kawakami, Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/127,150

(22) Filed: Jul. 31, 1998

(30) Foreign Application Priority Data

Aug. 4, 1997 (JP) .................................................. 9-209295

(51) Int. Cl.$^7$ ...................................................... H01F 7/06
(52) U.S. Cl. ............................ 29/602.1; 29/607; 29/892; 29/892.2; 192/84.961
(58) Field of Search .................................... 29/602.1, 607, 29/418, 527.3, 527.4, 527.6, 892, 892.2; 192/84.3, 84.961, 84.31, 84.5, 84.9; 335/281, 296, 297

(56) References Cited

U.S. PATENT DOCUMENTS

| | | | |
|---|---|---|---|
| 4,055,977 | * | 11/1977 | Haswell ..................................... 72/84 |
| 4,669,295 | * | 6/1987 | Koitabashi ............................. 72/340 |
| 4,694,945 | * | 9/1987 | Koitabashi ............................. 192/84 |
| 4,831,705 | | 5/1989 | Kanemitsu ........................ 29/159 R |
| 5,123,157 | * | 6/1992 | Cerny ....................................... 29/607 |
| 5,361,883 | * | 11/1994 | Yamamoto .......................... 192/84 C |
| 5,445,259 | * | 8/1995 | Nelson .............................. 192/107 R |
| 5,448,832 | * | 9/1995 | Kenemitsu et al. ................. 29/892.2 |
| 5,551,546 | * | 9/1996 | Tabayama et al. ................ 192/84.96 |
| 5,601,176 | * | 2/1997 | Ishimaru et al. ...................... 192/200 |
| 5,651,181 | * | 7/1997 | Shohara et al. ...................... 29/892.3 |
| 5,791,039 | * | 8/1998 | Tubuchi et al. ...................... 29/602.1 |
| 5,829,122 | * | 11/1998 | Keuerleber et al. ................. 29/602.1 |
| 5,924,537 | * | 7/1999 | Tobayama et al. ............. 192/84.961 |
| 5,967,282 | * | 10/1999 | Takahashi ....................... 192/84.961 |
| 6,041,490 | * | 3/2000 | Tabuchi et al. ......................... 29/607 |

FOREIGN PATENT DOCUMENTS 41 18 871 A1    12/1992    (DE) .

* cited by examiner

Primary Examiner—Lee Young
Assistant Examiner—Minh Trinh
(74) Attorney, Agent, or Firm—Harness, Dickey & Pierce, PLC

(57) ABSTRACT

A disk material is plastic-formed to form an inner cylindrical portion of a rotor and a cover member which covers an end side of the rotor. After that, the disk material is slit inwardly from an outside thereof in a radial direction of the disk material to form an outer cylindrical portion of the rotor and a pulley corresponding portion which will be the pulley. Finally, the pulley corresponding portion is plastic-formed to form a pulley groove. Thereby, even when the location of the pulley relative to the outer cylindrical portion are different, same processes can be applied to these different type pulley integrated rotors until the disk material is slit. That is, many different type pulley integrated type rotors can be manufactured with low cost while maintaining high concentric accuracy between the pulley and the rotor.

11 Claims, 7 Drawing Sheets

FIG. 6
FIG. 7
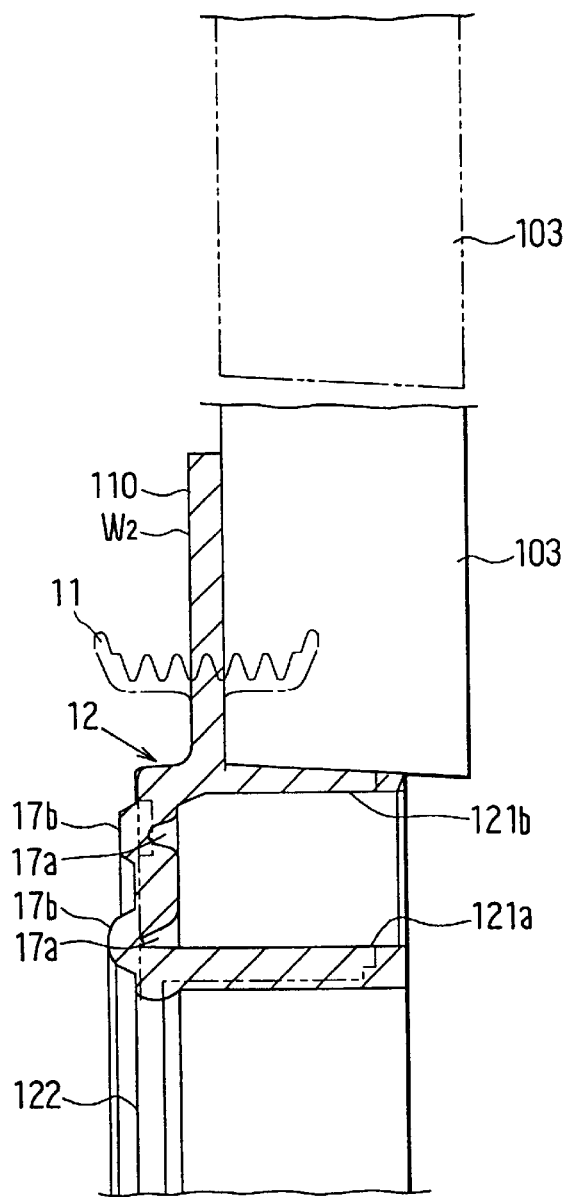
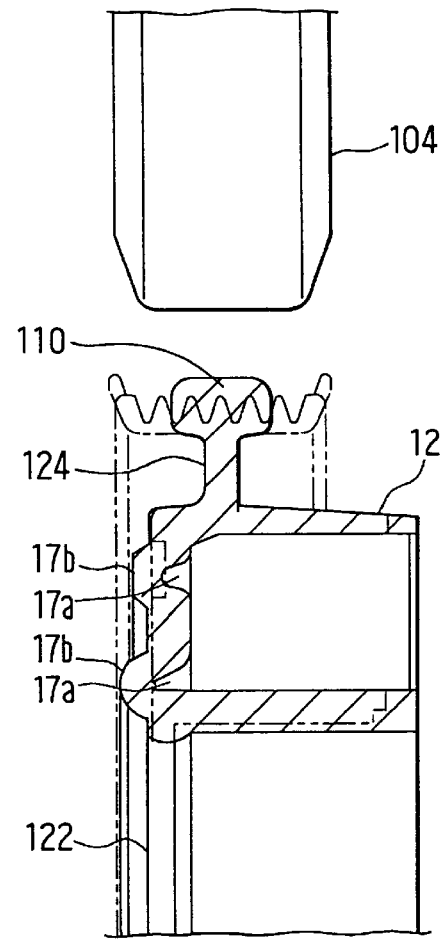

METHOD FOR MANUFACTURING PULLEY INTEGRATED TYPE ROTOR

CROSS REFERENCE TO RELATED APPLICATION

This application is based on and incorporates herein by reference Japanese Patent Application No. Hei. 9-209295 filed on Aug. 4, 1997.

BACKGROUND OF THE INVENTION

1. Field of the Invention

The present invention relates to a method for manufacturing a pulley integrated type rotor for an electromagnetic clutch, in which a pulley member and a rotor member are integrated with each other.

2. Description of Related Art

Conventionally, as shown in FIG. 14, in manufacturing process of an electromagnetic clutch, a pulley member 11 and a rotor member 12 are formed individually, then these are welded to be integrated with each other.

However, in the conventional manufacturing method, it is difficult to ensure a high concentric accuracy between the pulley member 11 and the rotor member 12 connected to each other, because of accumulation tolerances of the pulley member 11 and the rotor member 12 and connection tolerance between these members 11, 12. Therefore, the accumulation tolerances and the connection tolerance need to be strictly controlled, thereby increasing the manufacturing cost of the electromagnetic clutch.

SUMMARY OF THE INVENTION

An object of the present invention is to provide a method for manufacturing a pulley integrated type rotor for an electromagnetic clutch.

According to the present invention, an inner cylindrical portion of a double cylindrical portion and a cover member which covers an end side of the double cylindrical portion are formed by plastic-forming a disk material. After that, the disk material is slit inwardly from an outside thereof in a radial direction of the disk material to form an outer cylindrical portion of the double cylindrical portion and a pulley corresponding portion which will be the pulley member. Finally, a pulley groove is formed by plastic-forming the pulley corresponding portion.

Thus, even when the location of the pulley member relative to the outer cylindrical portion are different, same processes can be applied to these different type pulley integrated rotors until the slitting process. That is, different type pulley integrated type rotors can be manufactured with low cost while maintaining high concentric accuracy between the pulley member and the rotor member.

BRIEF DESCRIPTION OF THE DRAWINGS

Additional objects and advantages of the present invention will be more readily apparent from the following detailed description of preferred embodiments thereof when taken together with the accompanying drawings in which:

FIG. 6 is a cross sectional schematic view showing a slitting process in the manufacturing process of the pulley integrated type rotor;

FIGS. 7 and 8 are cross sectional schematic views showing a crushing process in the manufacturing process of the pulley integrated type rotor in a stepwise manner;

DETAILED DESCRIPTION OF PREFERRED EMBODIMENTS

Figure 1:
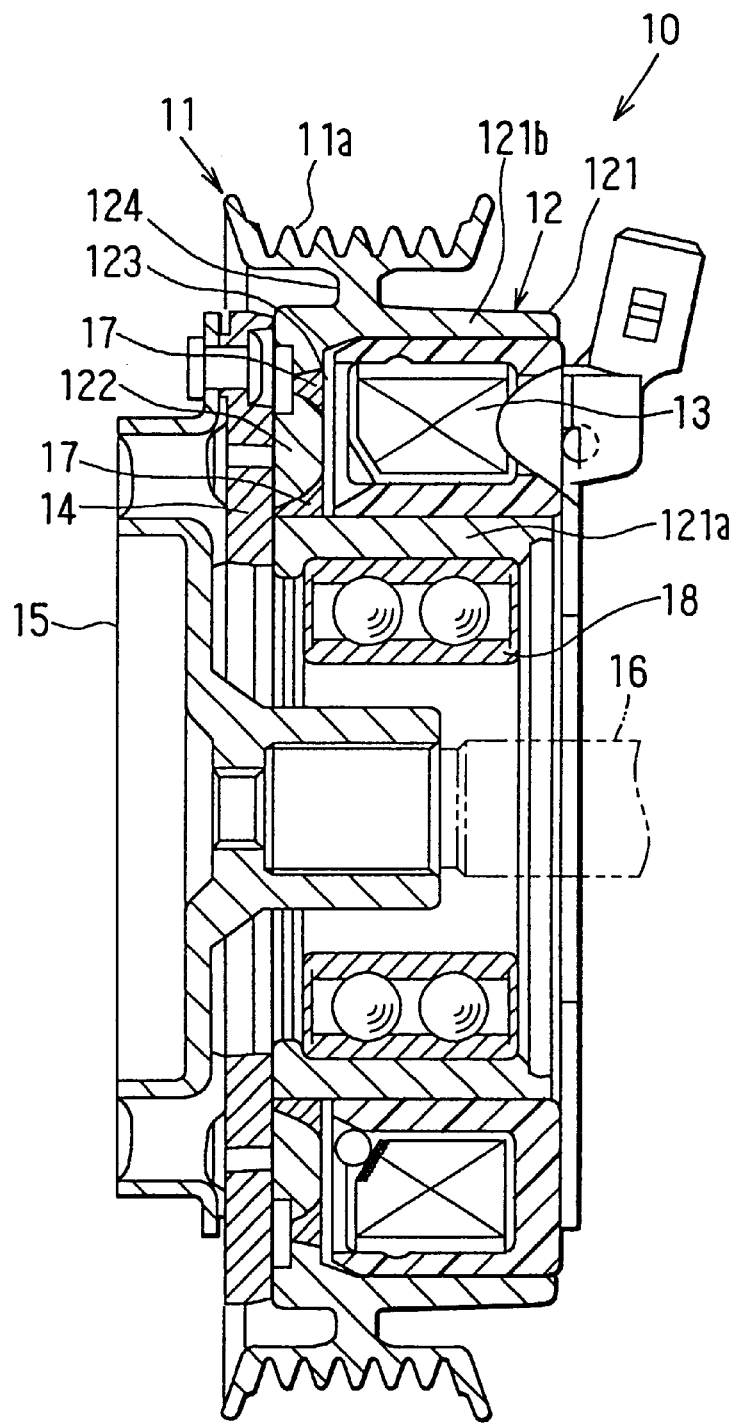
FIG. 1 is a cross sectional view showing an electromagnetic clutch.

FIG. 1 shows an electromagnetic clutch 10 having a rotor integrated with a pulley. The electromagnetic clutch 10 transmits a driving force from a vehicle engine (not illustrated) to a compressor (not illustrated) for vehicle refrigerant cycle intermittently. Hereinafter, a detailed structure of the electromagnetic clutch 10 will be described.

A pulley member 11 has grooves 11a on which a V-belt (not illustrated) is hung. A rotor member 12 includes a double cylindrical pipe portion 121 and a cover member 122 which covers one end side (side of an armature 14) of the double cylindrical pipe 121, and rotates with the pulley member 11 integrally. The pulley member 11 is connected to a protrusion portion 124 protruded outwardly from an outer cylindrical portion 121b, and is integrally formed with the rotor member 12.

The rotor member 12 functions as a part of a magnetic circuit for a magnetic flux generated by an exciting coil 13. The exciting coil 13 is installed into a ring-shaped space 123 formed between an inner cylindrical portion 121a and the outer cylindrical portion 121b of the double cylindrical pipe 121.

An armature 14 is connected to the shaft 16 of the compressor through a hub 15, and is attracted by the rotor 12 when an electric energy is supplied to the exciting coil 13. The rotor 12 includes a magnetic breaker space 17 at the cover member 122, which extends in the thickness direction (right and left direction in FIG. 1) of the cover member 122. Here, since the magnetic breaker space 17 is formed into a circle shape encircling the shaft 16, the inner cylindrical portion 121a is separated from the outer cylindrical portion by the magnetic breaker space 17. However, in the present embodiment, because a magnetic breaker member 17c made of non-magnetic material (for example, copper) is installed within the magnetic breaker space 17, the inner cylindrical portion 121a and the outer cylindrical portion 121b are connected via the magnetic breaker member 17c.

A bearing 18 is inserted and connected to the front housing (not illustrated) of the compressor, and supports the rotor member 12 rotatably.

Next, a method for manufacturing the pulley integrated type rotor in which the pulley member 11 is integrated with the rotor member 12 will be described. Here, in FIGS. 2–9, two dotted chain lines denote the final shape of the rotor.

Figure 2:
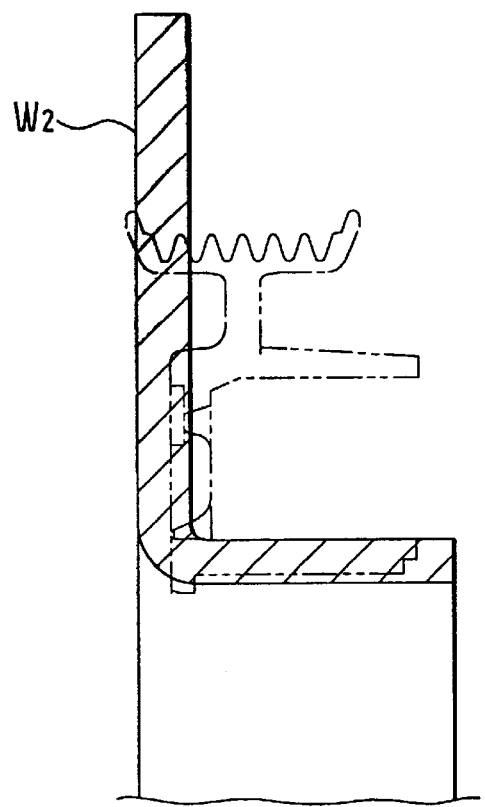
FIGS. 2–4 are cross sectional schematic views showing a rotor member forming process in a manufacturing process of a pulley integrated type rotor in a stepwise manner.
Figure 3:
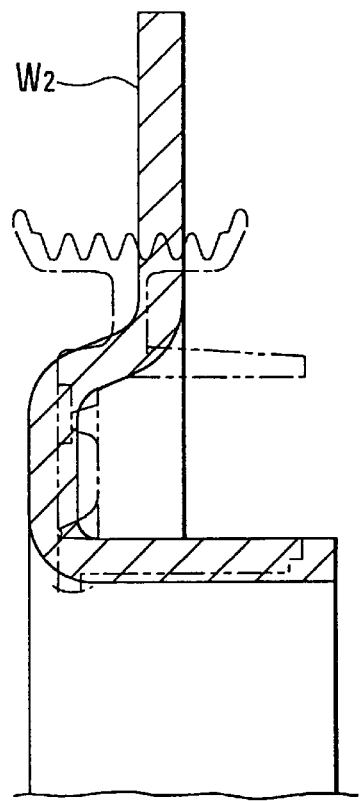
Figure 4:
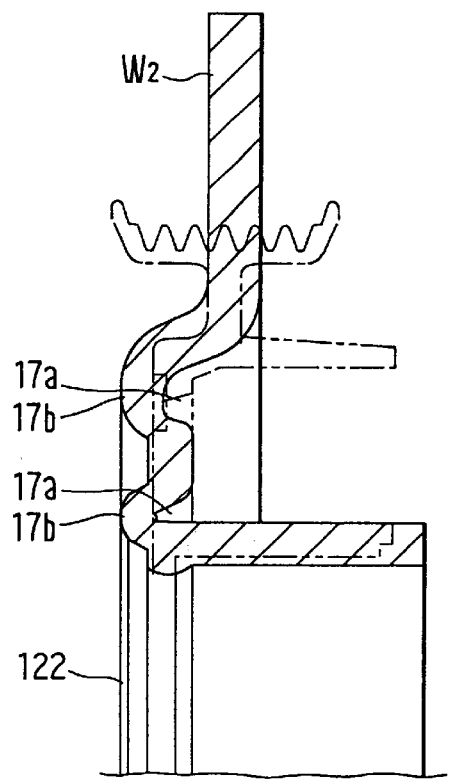

At first, as shown in FIGS. 2–4, the inner cylindrical portion 121a, the cover member 122, and concave portions 17a corresponding to the magnetic breaker space 17 are formed from disk material W2 made of a steel plate, by plural press-forming process (rotor member forming process). Here, the concave portion 17a is, as shown in FIG. 4, formed into waved-shape by bending a part of the disk material W2 which will be the bottom portion of the ring-shaped space 123.

Figure 5:
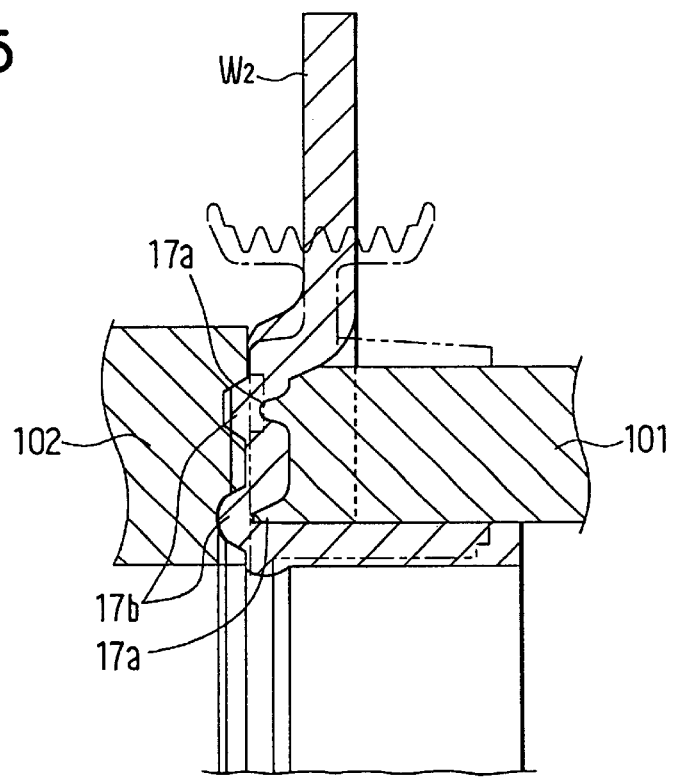
FIG. 5 is a cross sectional schematic view showing a grasping process in the manufacturing process of the pulley integrated type rotor.

Next, as shown in FIG. 5, a work W2 pressed in the rotor member forming process is grasped by a first jig 101 and a second jig 102. At this time, the first jig 101 is inserted into the concave portions 17a, and the second jig 102 is attached to convex portions 17b which are formed at the back surface of the concave portions 17a when the concave portions 17a are press-formed (grasping process).

After that, as shown in FIG. 6, the slitting roller 103 slits the outer periphery of the work W2 inwardly, to form the outer cylindrical portion 121b and a pulley corresponding portion 110 which will be the pulley member 11 (slitting process).

Figure 8:
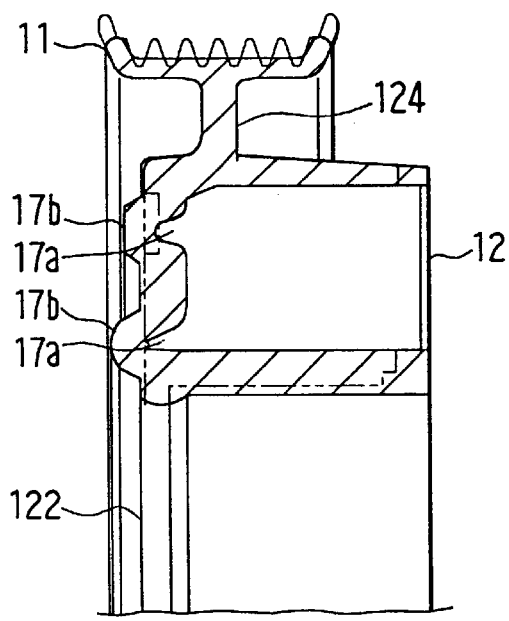

Then, as shown in FIGS. 7 and 8, a crushing roller 104 is pressed onto the pulley corresponding portion 110 under the condition that the work W2 is rotating to form the pulley member 11 and the protrusion portion 124. (crushing process). After that, a groove forming roller (not illustrated) is pressed onto the pulley corresponding portion 110 to previously form the pulley grooves 11a by roll-forming (groove forming process).

Figure 9:
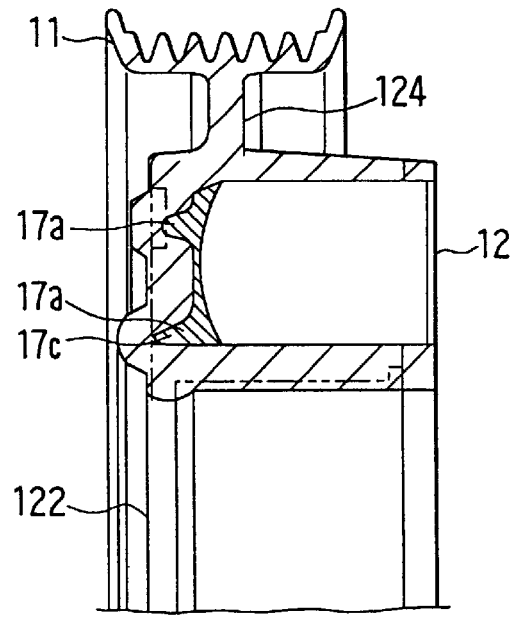
FIG. 9 is a cross sectional schematic view showing a connecting process in the manufacturing process of the pulley integrated type rotor.

Next, as shown in FIG. 9, the magnetic breaker member 17c is deposited in the concave portion 17a in a vacuum furnace (depositing process). A finishing roller (not illustrated) is pressed onto the previously formed pulley grooves 11a to finish the pulley grooves 11a (finishing process).

Figure 10:
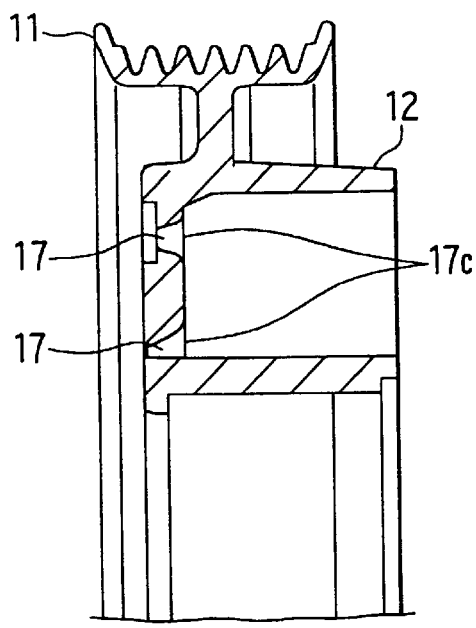
FIG. 10 is a cross sectional schematic view showing a cutting process in the manufacturing process of the pulley integrated type rotor.
Figure 11:
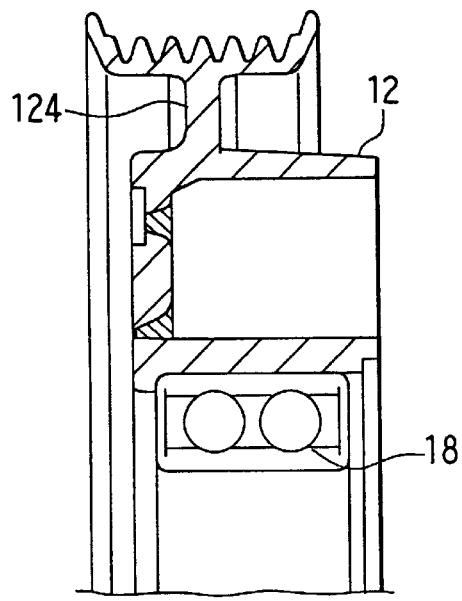
FIG. 11 is a cross sectional schematic view showing a press-inserting process in the manufacturing process of the pulley integrated type rotor.

The convex portions 17b, which correspond to the bottom portion of the concave portions 17a, are cut away (FIG. 10) to finish the surface of the rotor member 12 which contacts the armature 14. After that, as shown in FIG. 11, the bearing 18 is press-inserted into the rotor member 12 (press-inserting process).

Here, because the pressing pressure of the finishing roller is smaller than that of the groove-forming roller, the grasping process with the jigs 101, 102 can be eliminated in the finishing process.

Figure 12:
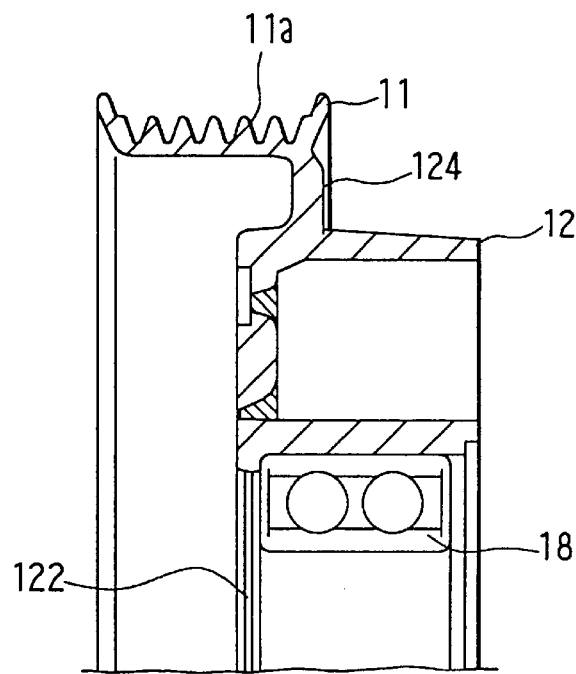
FIG. 12 is a cross sectional view showing a modification of the electromagnetic clutch.
Figure 13:
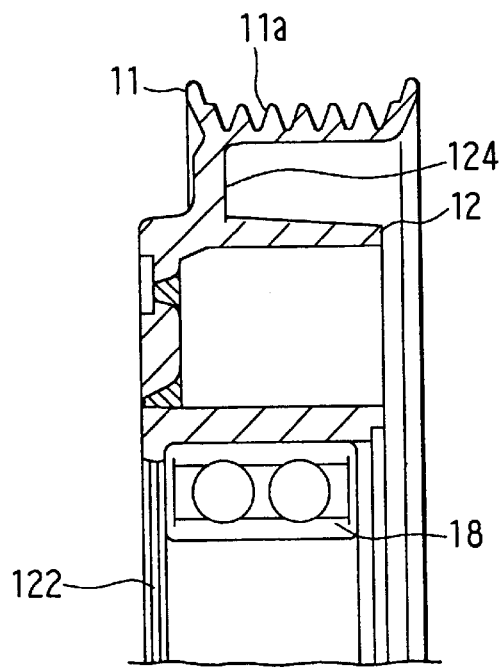
FIG. 13 is a cross sectional view showing another modification of the electromagnetic clutch.
Figure 14:
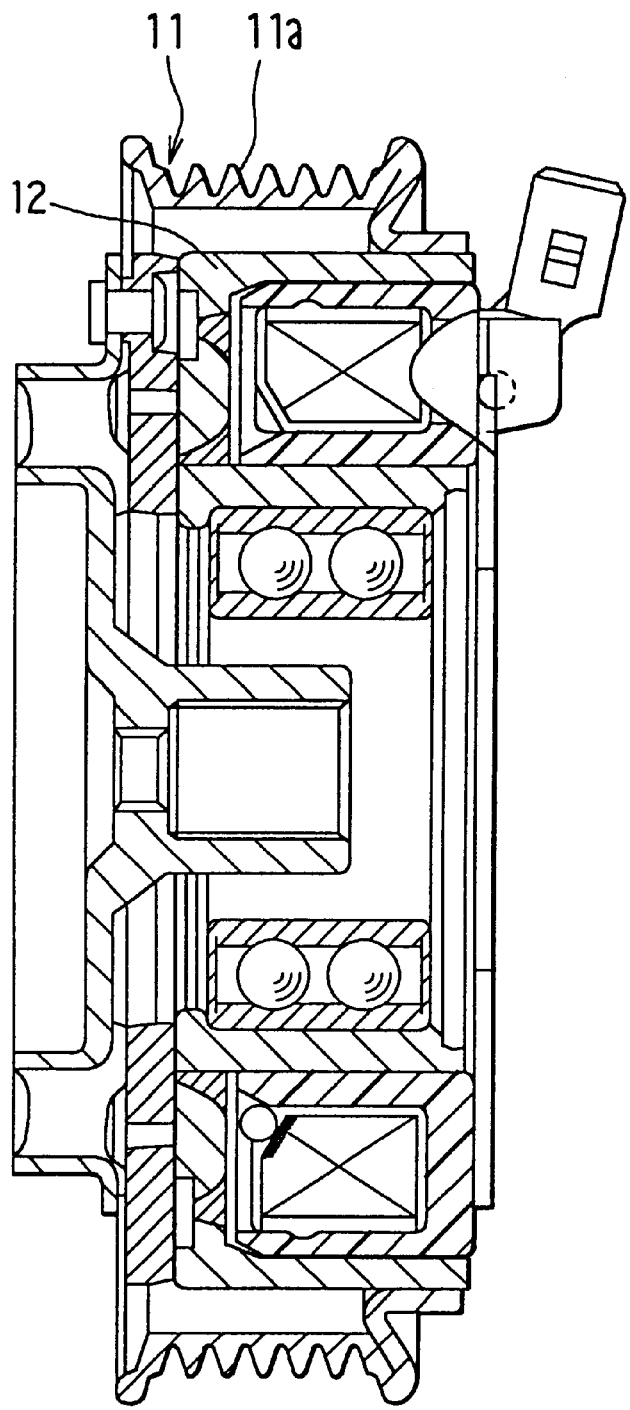
FIG. 14 a cross sectional view showing a conventional electromagnetic clutch.

In the present embodiment, after the pulley corresponding portion 110 and the outer cylindrical portion 121b are formed by the slitting process, the pulley corresponding portion 110 are roll-formed to form the pulley member 11 into a predetermined shape. Therefore, even when the location of the pulley member 11 relative to the outer cylindrical portion 121b are different, for example the protrusion portion 124 and the pulley member 11 are formed into T-shape (FIG. 11) or L-shape (FIGS. 12 and 13), same processes can be applied to these different type pulley integrated type rotors until the slitting process.

Accordingly, different type pulley integrated rotors can be manufactured with low cost while high concentric accuracy is maintained between the pulley member 11 and the rotor member 12.

Further, because the first jig 101 is inserted into the concave portions 17a and the second jig 102 is attached to the convex portions 17b to grasp the work W2, the work W2 is firmly grasped. Thereby, the pulley grooves 11a are formed with high yield, thus the pulley integrated rotor can be manufactured without causing a rise of the manufacturing cost.

Further, because the work W2 is firmly grasped, the groove forming roller can be strongly pressed onto the work W2, thereby shortening a time for forming the pulley grooves 11a.

Incidentally, when the concave portions 17a and the convex portion 17b are formed by coining process, because the slide-deforming value is large in the coining process, a solid lubricant needs to be provided between the work and the jig. Further, after the coining process, the solid lubricant needs to be eliminated to prevent a connecting deterioration at the magnetic breaker portion 17c. That is, a solid lubricant eliminating process such as a shot-brushed (sand-brushed) is needed.

However, in the present embodiment, as the disk material W2 is press-formed by plural times to form the concave portions 17a and the convex portions 17b, the slide-deformation in one press-forming process is small. Thus, a liquid lubricant such as mold lubricant can be used, and the solid lubricant eliminating process is not needed, thereby shortening the time for manufacturing the pulley integrated rotor.

In the above-described embodiment, the rotor forming process is done by press-forming process, however, the rotor forming process may be done by roll-forming process instead. In this case, the disk material W1 is gradually plastically deformed, the liquid lubricant can be used as in the above-described embodiment. As a result, the solid lubricant eliminating process is not needed, thereby reducing the manufacturing cost.

What is claimed is:

1. A method for manufacturing an electromagnetic clutch having a pulley member including a pulley groove on which a V-belt is hung, and a rotor member rotating with said pulley member integrally and including a double cylindrical portion and a cover member covering an end side of said double cylindrical portion, said method comprising:

a rotor member forming process in which a single piece disk material is plastic-formed to form an inner cylindrical portion of said double cylindrical portion and said cover member;

a slitting process in which said single piece disk material is slit inwardly from an outside thereof in a radial direction of said disk material to form an outer cylindrical portion of said double cylindrical portion and a pulley corresponding portion which will be said pulley member, said pulley corresponding portion extending from a protrusion portion protruding outwardly from said outer cylindrical portion; and a pulley member forming process in which said pulley corresponding portion is plastic-formed to form said pulley groove.

2. The method for manufacturing an electromagnetic clutch according to claim 1, wherein said pulley corresponding portion is roll-formed to form said pulley groove in said pulley member forming process.

3. The method for manufacturing an electromagnetic clutch according to claim 1, wherein in the rotor member forming process, a concave portion is formed from said single piece disk material simultaneously with formation of said inner cylindrical portion and said cover member.

4. The method for manufacturing an electromagnetic clutch according to claim 3, further comprising a grasping process in which a work formed in the rotor forming process is grasped by a first jig and a second jig, wherein said first jig is inserted into said concave portion and said second jig is attached to a convex portion which is formed at a back surface of said concave portion when said concave portion is formed.

5. The method for manufacturing an electromagnetic clutch according to claim 3, further comprising a depositing process in which a magnetic breaker member is deposited into said concave portion.

6. The method for manufacturing an electromagnetic clutch according to claim 5, wherein said magnetic breaker member is made of non-magnetic material such as copper.

7. A method for manufacturing an electromagnetic clutch having a pulley member integral with a rotor member, said method comprising:

providing a single piece disk material;

forming an inner cylindrical portion from said single piece disk material;

forming an outer cylindrical portion from said single piece disk material;

forming a protrusion from said single piece disk material, said protrusion extending radially outward from said outer cylindrical portion; and forming a pulley groove from said single piece disk member, said protrusion extending between said outer cylindrical portion and said pulley groove.

8. The method according to claim 7 wherein the step of forming said pulley groove includes roll-forming said pulley groove.

9. The method according to claim 7 further comprising forming a cover member from said single piece disk material.

10. The method according to claim 9 further comprising forming a concave portion in said cover member.

11. The method according to claim 10 further comprising depositing a magnetic breaker member in said concave portion.

* * * * *